United States Patent Office

3,235,522
Patented Feb. 15, 1966

3,235,522
PETROLEUM RESIN-RUBBER-AROMATIC OIL EMULSION FOR TREATING ASPHALT SURFACES
Donald E. Carr, Bartlesville, Okla., assignor to Phillips Petroleum Company, a corporation of Delaware
No Drawing. Filed Feb. 20, 1962, Ser. No. 174,388
10 Claims. (Cl. 260—23.7)

This invention relates to a method for maintaining or reconditioning asphalt surfaces, such as roads, roofs, etc. This invention also relates to a composition for use in maintaining asphalt surfaces as herein described.

In one of its aspects, the invention relates to a composition comprising an aqueous emulsion of an aromatic oil, a petroleum resin and a butadiene-styrene synthetic rubber, the composition containing in a preferred form thereof a minor amount of tall oil. In another of its aspects, the invention relates to a method for the reconditioning or sealing of an asphalt road, roof or other surfaces by applying thereto a composition as set forth herein. In a particular form of the composition, it is sprayed as an aqueous emulsion upon a weathered surface causing water evaporation to take place whereupon the non-aqueous portion covers the weathered surface and fills the cracks, especially small cracks which are extant in said surface.

It is known in the art that asphalt surfaces of roads and roofs deteriorate with time due to heat, oxidation and volatilization of oils. The oxidation and drying of the oils result in considerable hardening of the asphalt. Further, the working of the asphalt surface with change in temperature, over time, results additionally in the formation of signs of deterioration.

When roads undergo this aging effect, the asphalt gradually and permanently becomes harder and brittle; and cracks are readily formed in the surface. These cracks, in turn, allow water to penetrate the surface. Winter freezing and thawing rapidly enlarge these cracks, with ultimate failure of the road surface. Deep cracks, of course, allow water to penetrate to the road base and result in base failure, which, in turn, causes failure of large areas of the asphaltic concrete or macadam layer.

Asphalt roofs, though not subjected to the traffic of pavements, age in the same manner; and as a result, check or "alligator" and become dry and dusty. Roof surfaces are thin compared to road surfaces, and much smaller and shallower cracks result in failure.

The present invention provides a composition and method of using the composition whereby the aged asphalt surfaces of roads and roofs are restored to tough, ductile surfaces resistant to cracking and deterioration. The treatment is particularly effective as a preventive maintenance measure which greatly lengthens the life of roads and roofs, and long periods of use free of major repairs are obtained.

Thus, a composition of the present invention, in one of its forms, is an aqueous emulsion of a heavy aromatic oil, preferably a heavy aromatic petroleum oil, a dispersion of butadiene-styrene rubber and a petroleum resin. In a preferred form, a minor amount of tall oil and a small amount of an emulsifier are included in the emulsion thereby obtaining increased stability.

It is an object of this invention to provide a method for maintaining asphalt surfaces. It is another object of this invention to provide a composition for maintaining asphalt surfaces. It is a further object of this invention to provide a method and composition for sealing cracks which develop in aged asphalt surfaces, such as surfaces of roads, roofs, etc.

Other aspects, objects and the several advantages of this invention are apparent from a study of this disclosure and the appended claims.

According to the present invention, there is provided a method which comprises applying to asphalt surface a composition comprising an aqueous emulsion of an aromatic oil, a petroleum resin and a butadiene-styrene synthetic rubber. Also, according to the invention, there is provided such a method in which, in addition, the composition contains a minor amount of tall oil. Further, according to the invention, are provided the compositions which are used in the method thereof.

The composition applied to a weathered surface, for example, by spraying, will adhere tenaciously thereto and, upon evaporation of the water phase, when it is applied as an aqueous emulsion, will cover the weathered surface, filling the cracks by action of the solvent power of the aromatic oil for both the weathered asphalt and the resin and rubber of the emulsion. Thus, the added rubber and resin are actually incorporated into the weathered surface forming a seal and, in effect, increasing the ductility of the weathered surface. Thus, it is within the scope of the invention to apply a treatment and composition of the invention to a newly-formed or laid surface.

The oil, resin and rubber are present in particular ranges. Based on the total of 100 parts by volume of these three components, 5 to 20 parts are rubber, 30 to 60 parts are petroleum resins, and the remainder is oil. Tall oil is preferably present in addition in an amount of 1 to 5 parts by volume.

The oil used in making these compositions is aromatic, the viscosity-gravity constant being at least 0.85, and preferably at least 0.86. Viscosity of the oils is in the range of 100–400 SUS at 210° F., preferably 125–300 SUS at 210° F. It is further preferred that the oil be a mixture of molecular weights and at least 40 volume percent of the oil has a viscosity above 250 SUS at 210° F., thus insuring that a considerable part of the oil will be of very low volatility and will not be easily lost from the surface by vaporization. The use of a portion of the high molecular weight oil assures that the treatment will have a long term effect, while the inclusion of a lower molecular weight oil assures that the composition will not be too hard and will penetrate and mix with the old asphalt. Extract oils from extraction of lubricating oils with polar selective solvents, e.g., phenol, chlorex, and similar, are suitable for use as the oil portion of this composition.

The rubber used in this composition is of the butadiene-styrene type because it is compatible with the oils and resins in the composition and, therefore, will be carried into the old asphalt surface (butyl and neoprene rubbers are to be avoided, as these are essentially oil-resistant materials which will not be satisfactorily carried into the weathered asphalt surface). The rubber is advantageously used in the latex form, this highly dispersed form being easily mixed with the other ingredients and also furnishing at least part of the water for the emulsion.

Petroleum resins are well known in the asphalt art, and are one of the ingredients of asphalt. Asphalt consists essentially of oils, resins and asphaltenes. The oil and resin fraction ("maltenes") can be separated from the asphaltenes by dissolving the maltene fraction in pentane, the asphaltenes being undissolved. The oils and resins can then be separated by propane fractionation, the resins being rejected by the propane. These resins ordinarily have ring and ball softening points of 75–175° F., molecular weights of 1000 to 2000 (ebulliometric method), and H/C ratios (atomic) of 1:1 to 1.5:1. The resins with ring and ball softening points of 75–150° F. are preferred for use according to this invention.

Tall oil is a well known material which is a by-product of the paper industry. It is a complex mixture with a high proportion of organic acids including fatty acids and rosin acids. The inclusion of tall oil in the composition aids, among other effects, the formation of the emulsion, particularly in those instances in which alkaline water is used in making these emulsions. Additionally, the tall oil improves the penetration of the emulsion into the fissures to be sealed and improves the initial bond formed between the organic portion of the emulsion and the surfaces to be treated. Also, the tall oil aids in reformation of the bond between aggregate surfaces and asphalt which have deteriorated due to aging.

The inclusion of additional emulsifying agents is within the scope of the invention, such emulsifying agents being well known in the art. Typical of such agents are alkali metal salts of fatty acids, sulfonated tall oil, sulfonated alkyl aromatics, etc.

The emulsions used according to this invention ordinarily contain at least 50 volume percent water, although less water can be used. Application is greatly simplified by using low viscosity emulsions of 70–95 percent water, ordinary water sprinkling trucks being satisfactory for use with the high water content emulsions. Rates of application are preferably in the range of 0.01 to 0.05 gallon of oil-rubber-resin mixture per square yard. The actual amount of emulsion required to effect this will, of course, depend on the water content. More than one application can be used in order to effect the treatment.

No cover material is required when using this treatment; and, if one is used, it should be a very fine aggregate.

Rolling of the surface after treatment is not required, but rolling will effect a faster incorporation of the mixture into the weathered asphalt. On roads, traffic will effect mixing of the treating material with the weathered surface asphalt.

*Example*

An aqueous emulsion containing a heavy aromatic petroleum oil having a viscosity gravity constant of about 0.86, a viscosity of 150 SUS at 210° F. and of a low volatility such that a major portion of it alone evaporates over a period of years and obtained by solvent extraction of a lubricating oil with a polar solvent, e.g., phenol; 15 parts (by volume of ingredients oil, rubber and resin) of butadiene-styrene rubber (GR–S); 35 parts of petroleum resin obtained by pentane extraction of asphalt; 2 parts tall oil (in a preferred modified form of this example) is sprayed upon a weathered, dry asphalt surface. After evaporation of the water, the layer of ingredients is seen to have sealed cracks and to have plasticized the surface.

Reasonable variation and modification are possible within the scope of the foregoing disclosure and the appended claims to the invention, the essence of which is that there have been provided a composition comprising an aqueous emulsion of an aromatic oil, a petroleum resin, butadiene-styrene synthetic rubber and, in a preferred form, the composition also containing a minor amount of tall oil, and a method according to which a composition according to the invention is applied to either a new or weathered or used surface containing asphalt.

I claim:

1. A composition suitable for application to an asphalt surface comprising an aqueous emulsion consisting essentially of from 20–65 parts of an aromatic oil, from 30–60 parts of a petroleum resin obtained from asphalt and separated from asphaltenes and from 5–20 parts of a butadiene-styrene synthetic rubber, the parts being by volume.

2. A composition suitable for application to an asphalt-containing surface comprising an aqueous emulsion consisting essentially of from 20–65 parts of an aromatic petroleum oil, from 30–60 parts of a petroleum resin obtained from asphalt and separated from asphaltenes and having molecular weights of 1000 to 2000, from 5–20 parts of a butadiene-styrene synthetic rubber, and from 1–5 parts of tall oil, the parts being by volume.

3. A composition suitable for application to an asphalt surface comprising an aqueous emulsion consisting essentially of from 20–65 parts of a heavy aromatic petroleum oil, from 30–60 parts of a petroleum resin obtained from asphalt and separated from asphaltenes and having a ring and ball softening point of 75–175° F., from 5–20 parts of a butadiene-styrene synthetic rubber, and from 1–5 parts of tall oil, the parts being by volume.

4. A method of improving the surface characteristics of an asphalt-containing surface which comprises applying thereto a composition comprising an aqueous emulsion consisting essentially of from 20–65 parts of an aromatic oil, from 30–60 parts of a petroleum resin obtained from asphalt and separated from asphaltenes and from 5–20 parts of a butadiene-styrene synthetic rubber, the parts being by volume.

5. A method for improving the surface characteristics of an asphalt-containing surface which comprises applying thereto an aqueous emulsion consisting essentially of from 20–65 parts of a heavy aromatic petroleum oil, from 30–60 parts of a petroleum resin obtained from asphalt and separated from asphaltenes, from 5–20 parts of a butadiene-sytrene synthetic rubber and from 1–5 parts of tall oil, the parts being by volume.

6. A composition suitable for application to an asphalt surface comprising an aqueous emulsion consisting essentially of from 20–65 parts of an aromatic petroleum oil having a viscosity-gravity constant of at least 0.85 and a viscosity in the range of 100–400 SUS at 210, from 30–60 parts of a petroleum resin obtained from asphalt and separated from asphaltenes and from 5–20 parts of a butadiene-styrene synthetic rubber, the parts being by volume.

7. A composition suitable for application to an asphalt-containing surface comprising an aqueous emulsion consisting essentially of from 20–65 parts of a heavy aromatic petroleum oil having a viscosity-gravity constant of at least 0.85 and a viscosity in the range of 100–400 SUS at 210° F., from 30–60 parts of a petroleum resin obtained from asphalt and separated from asphaltenes and having a molecular weight of 1000 to 2000, from 5–20 parts of a butadiene-styrene synthetic rubber, and from 1–5 parts of tall oil, the parts being by volume.

8. A composition suitable for application to weathered asphalt surfaces comprising aqueous emulsions consisting essentially of oil, resin and rubber in amounts and having characteristics as follows: 5–20 parts butadiene-styrene synthetic rubber, 30–60 parts petroleum resins obtained from asphalt and separated from asphaltenes and having a ring and ball softening point of 75–175° F., and 20–65 parts aromatic petroleum oil having a viscosity-gravity constant of at least 0.85 and a viscosity in the range of 100–400 SUS at 210° F., the parts being by volume.

9. A method of improving the surface characteristics of an asphalt-containing surface which comprises applying thereto an aqueous emulsion consisting essentially of from 20–65 parts of an aromatic petroleum oil having a viscosity-gravity constant of at least 0.85 and a viscosity in the range of 100–400 SUS at 210° F., from 30–60 parts of a petroleum resin obtained from asphalt and separated from asphaltenes and having a softening point of 75–175° F., and from 5–20 parts of a butadiene-styrene synthetic rubber, the parts being by volume.

10. A method for improving the surface characteristics of an asphalt-containing surface which comprises applying thereto an aqueous emulsion consisting essentially of from 20–65 parts of a heavy aromatic petroleum oil having a viscosity-gravity constant of at least 0.85 and a viscosity in the range of 100–400 SUS at 210° F., from 30–60 parts of a petroleum resin obtained from asphalt and separated from asphaltenes and having an H/C ratio of 1:1 to 1.5:1, from 5–20 parts of a butadiene-styrene synthetic rubber and from 1–5 parts of tall oil, the parts being by volume.

References Cited by the Examiner

UNITED STATES PATENTS

| | | | |
|---|---|---|---|
| 2,092,332 | 9/1937 | Plaizier et al. | 260—745 |
| 2,802,798 | 8/1957 | Smith | 260—33.6 |
| 3,002,940 | 10/1961 | Holloway | 260—23 |
| 3,055,853 | 9/1962 | Pickell | 260—23.7 |
| 3,085,889 | 4/1963 | Swift | 260—23.7 |
| 3,093,601 | 6/1963 | Gessler et al. | 260—23.7 |
| 3,097,179 | 7/1963 | Ceintrey | 260—745 |
| 3,162,101 | 12/1964 | Rostler | 94—23 |

OTHER REFERENCES

Schwartz et al.: "Surface Active Agents and Detergents," vol. II, pp. 32–33, Interscience Publishers, Inc., New York, 1958.

LEON J. BERCOVITZ, *Primary Examiner.*

ALPHONSO D. SULLIVAN, DONALD E. CZAJA,
*Examiners.*